(12) United States Patent
Sossenheimer et al.

(10) Patent No.: US 9,952,322 B2
(45) Date of Patent: Apr. 24, 2018

(54) METHOD FOR OPERATING AN OPTOELECTRONIC PROXIMITY SENSOR AND OPTOELECTRONIC PROXIMITY SENSOR

(71) Applicant: OSRAM Opto Semiconductors GmbH, Regensburg (DE)

(72) Inventors: Dirk Sossenheimer, Regensburg (DE); Christian Müller, Deuerling (DE)

(73) Assignee: OSRAM Opto Semiconductors GmbH (DE)

( * ) Notice: Subject to any disclaimer, the term of this patent is extended or adjusted under 35 U.S.C. 154(b) by 257 days.

(21) Appl. No.: 14/375,620

(22) PCT Filed: Jan. 29, 2013

(86) PCT No.: PCT/EP2013/051680
§ 371 (c)(1),
(2) Date: Jul. 30, 2014

(87) PCT Pub. No.: WO2013/113695
PCT Pub. Date: Aug. 8, 2013

(65) Prior Publication Data
US 2015/0022474 A1 Jan. 22, 2015

(30) Foreign Application Priority Data
Jan. 31, 2012 (DE) .................. 10 2012 100 762

(51) Int. Cl.
*G06F 3/03* (2006.01)
*G06F 3/041* (2006.01)
(Continued)

(52) U.S. Cl.
CPC .............. *G01S 17/02* (2013.01); *G01S 7/484* (2013.01); *G01S 17/026* (2013.01);
(Continued)

(58) Field of Classification Search
CPC ........ G01S 17/00; G01S 17/02; G01S 17/026; G01S 17/06; G01S 17/08
See application file for complete search history.

(56) References Cited

U.S. PATENT DOCUMENTS 4,332,468 A 6/1982 Stützle
5,699,151 A 12/1997 Akasu
(Continued)

FOREIGN PATENT DOCUMENTS

DE 40 19 927 1/1992
DE 196 39 286 4/1998
(Continued)

OTHER PUBLICATIONS

Proakis, J.G.;"*Digital Communications*", McGraw Hill Education, New York, Dec. 31, 1995, pp. 39-41, 58, ISBN:978-0-07-113814-7.
(Continued)

*Primary Examiner* — Benjamin C Lee
*Assistant Examiner* — Dong Hui Liang
(74) *Attorney, Agent, or Firm* — DLA Piper LLP (US)

(57) ABSTRACT

A method of operating an optoelectronic proximity sensor including a radiation-emitting component, a radiation-detecting component and a control unit includes: operating the radiation-emitting component with a pulsed current, wherein the pulsed current of the radiation-emitting component has an on time and an off time during a measurement period, and causing the control unit to evaluate a detector signal of the radiation-detecting component during the on time and ending the on time if the detector signal exceeds a threshold value, wherein the ratio of the on time to the measurement period is less than 1/10.

15 Claims, 3 Drawing Sheets

(51) Int. Cl.
*G01S 17/02* (2006.01)
*G01S 7/484* (2006.01)
*G06F 1/32* (2006.01)

(52) U.S. Cl.
CPC .......... *G06F 1/3231* (2013.01); *G06F 3/0304* (2013.01); *G06F 3/0412* (2013.01); *Y02B 60/1289* (2013.01)

(56) References Cited

U.S. PATENT DOCUMENTS

| | | | |
|---|---|---|---|
| 9,604,054 | B2 | 3/2017 | Thieme et al. |
| 2003/0219056 | A1 | 11/2003 | Yager et al. |
| 2004/0142705 | A1 | 7/2004 | Casebolt et al. |
| 2009/0278473 | A1* | 11/2009 | Van Erp .............. H02J 13/0003 315/294 |
| 2010/0201276 | A1* | 8/2010 | Chen ................... G01S 17/026 315/158 |
| 2011/0295537 | A1 | 12/2011 | Akers et al. |
| 2012/0081031 | A1 | 4/2012 | Kameyama et al. |
| 2013/0050677 | A1* | 2/2013 | Kwong ................ G01S 17/026 356/51 |
| 2015/0022474 | A1 | 1/2015 | Sossenheimer et al. |

FOREIGN PATENT DOCUMENTS

| | | | |
|---|---|---|---|
| DE | 198 47 548 | | 9/1999 |
| DE | 198 52 173 | | 5/2000 |
| DE | 100 32 864 | | 1/2002 |
| DE | 102 33 139 | | 1/2004 |
| DE | 10 2011 081 487 | | 2/2013 |
| EP | 0 926 512 | | 6/1999 |
| FR | 2 685 092 | | 6/1993 |
| GB | 2 355 523 | | 4/2001 |
| GB | 2355523 A | * | 4/2001 ............ G01S 7/483 |
| JP | 11-148974 | | 6/1999 |
| JP | 2010-199706 | | 9/2010 |

OTHER PUBLICATIONS

International Search Report dated Oct. 22, 2014.
Datasheet SFH 7741 "Proximity Sensor," OSRAM Opto Semiconductors GmbH, Leibnizstr. 4, 93055, Regensburg, Germany, Oct. 27, 2010, pp. 1-7.
Datasheet SFH 7770 "Ambient Light and Proximity Sensor," OSRAM Opto Semiconductors GmbH, Leibnizstr. 4, 93055, Regensburg, Germany, Jan. 25, 2011, pp. 1-28.
Office Action dated Jan. 10, 2018, of related U.S. Appl. No. 14/904,683.

* cited by examiner

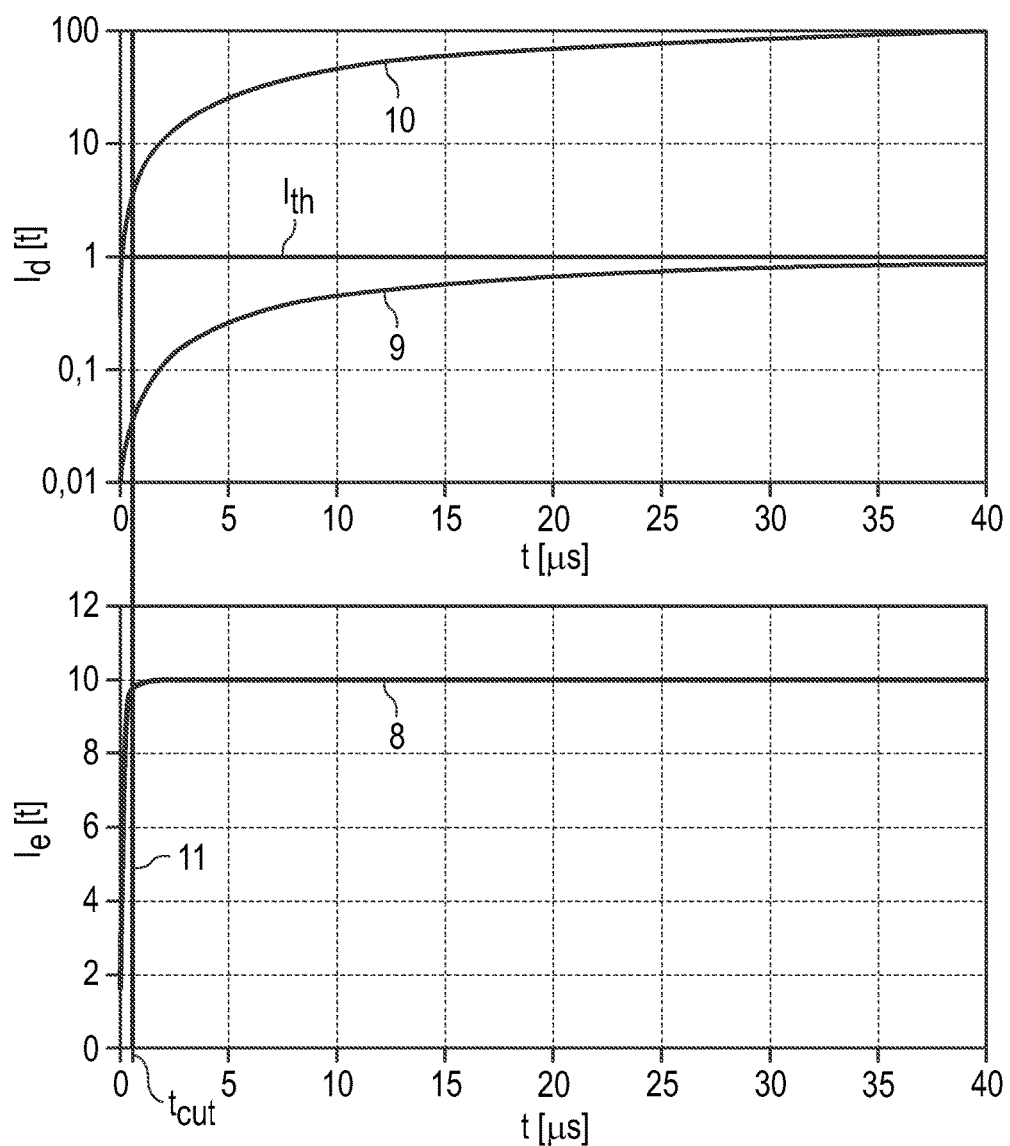

METHOD FOR OPERATING AN OPTOELECTRONIC PROXIMITY SENSOR AND OPTOELECTRONIC PROXIMITY SENSOR

TECHNICAL FIELD

This disclosure relates to a method of operating optoelectronic proximity sensors and optoelectronic proximity sensors made by the methods.

BACKGROUND

Optoelectronic proximity sensors are generally used to detect the proximity of an object and, if appropriate, to initiate a switching process. By way of example, an optoelectronic proximity sensor can be used to switch an electronic apparatus on or off if the latter is touched by a user or a body part of the user is at a small distance from the apparatus.

An optoelectronic proximity sensor typically contains a radiation-emitting component and a radiation-detecting component arranged alongside the latter, wherein the radiation-detecting component receives the radiation of the radiation-emitting component reflected by an object if such an object is situated in the vicinity of the optoelectronic proximity sensor. In other words, the function of an optoelectronic proximity sensor is based on the principle of a reflection light barrier.

To obtain a high sensitivity and/or a large range of the optoelectronic proximity sensor, the radiation-emitting component has to be operated with a comparatively high current intensity. The current consumption of an optoelectronic proximity sensor is therefore significantly determined by the current consumption of the radiation-emitting component.

It could therefore be helpful to provide a method of operating an optoelectronic proximity sensor and an optoelectronic proximity sensor wherein current consumption of the radiation-emitting component is reduced, without the sensitivity and/or the range of the optoelectronic proximity sensor being significantly impaired.

SUMMARY

We provide a method of operating an optoelectronic proximity sensor including a radiation-emitting component, a radiation-detecting component and a control unit, the method including: operating the radiation-emitting component with a pulsed current, wherein the pulsed current of the radiation-emitting component has an on time and an off time during a measurement period, the control unit to evaluate a detector signal of the radiation-detecting component during the on time and ending the on time if the detector signal exceeds a threshold value, wherein the ratio of the on time to the measurement period is less than 1/10.

We also provide an optoelectronic proximity sensor including a radiation-emitting component, a radiation-detecting component and a control unit wherein the control unit operates the radiation-emitting component with a pulsed current, the pulsed current has an on time and an off time during a measurement period, and a ratio of the on time to the measurement period is less than 1/10, and evaluates a detector signal of the radiation-detecting component during the on time and to end the on time if the detector signal exceeds a threshold value.

We further provide an electronic apparatus, including an optoelectronic proximity sensor according to this disclosure.

BRIEF DESCRIPTION OF THE DRAWINGS

FIG. 3 shows a schematic graphical illustration of the temporal profile of the detector signal $I_d$ and of the current $I_e$ of the radiation-emitting component during the on time of a pulse in an optoelectronic proximity sensor in accordance with one example.

DETAILED DESCRIPTION

Figure 1:
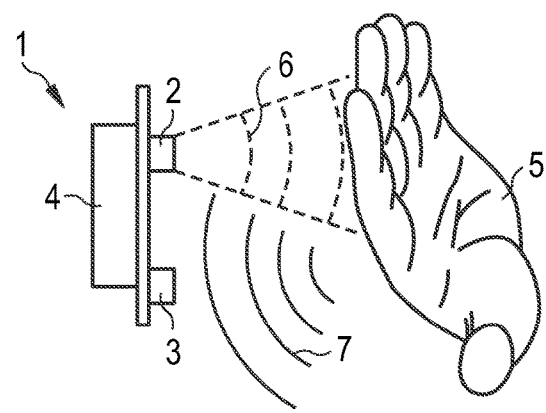
FIG. 1 shows a schematic illustration of an optoelectronic proximity sensor in accordance with one example.

In our method of operating an optoelectronic proximity sensor, the proximity sensor may comprise at least one radiation-emitting component. The radiation-emitting component is preferably a radiation-emitting semiconductor component. The radiation-emitting component is preferably an LED, in particular an infrared LED. By way of example, an infrared LED having a wavelength of approximately 850 nm can be used.

Furthermore, the optoelectronic proximity sensor comprises a radiation-detecting component. The radiation-detecting component detects radiation of the radiation-emitting component reflected at an object. The radiation-detecting component is preferably a radiation-detecting semiconductor component, for example, a photodiode or a phototransistor.

Furthermore, the optoelectronic proximity sensor comprises a control unit. The control unit in particular drives the radiation-emitting component and the radiation-detecting component and evaluates a detector signal of the radiation-detecting component. The control unit can output a logical output signal, for example, depending on whether or not a detector signal of the radiation-detecting component exceeds a threshold value, e.g. "L", if no object is situated in the vicinity of the proximity sensor and the threshold value of the detector signal is therefore not exceeded, or "H" if an object is situated in the vicinity of the proximity sensor and the threshold value of the detector signal is therefore exceeded. An output signal of the control unit can be used, for example, to initiate an electrical switching process.

The radiation-emitting component is advantageously operated with a pulsed current. In this way, a measurement of whether or not an object is situated in the vicinity of the proximity sensor is carried out at periodic intervals. The measurement period $T_m$, that is to say the period of the pulsed current of the radiation-emitting component, can be, for example, 1 ms to 2000 ms. The pulsed current of the radiation-emitting component has an on time $t_{on}$ and an off time $t_{off}$ during a measurement period $T_m$. The on time is preferably significantly less than the off time and also significantly less than the measurement $T_m$. The on time $t_{on}$ can be, for example, 1 µs to 100 ms. The duty ratio $t_{on}/T_m$ of the pulsed current of the radiation-emitting component is advantageously less than 1/10, preferably less than 1/100, or even less than 1/1000. Advantageously, the radiation-emitting component is operated only during a small fraction of the measurement period, as a result of which the current consumption of the optoelectronic proximity sensor is reduced.

An advantageous further reduction of the current consumption of the optoelectronic proximity sensor is achieved in accordance with the principle proposed here by virtue of the fact that the control unit evaluates a detector signal of the radiation-detecting component during the on time and ends the on time if the detector signal exceeds a threshold value. The detector signal can be the photocurrent of the radiation-detecting component or a variable derived therefrom, for example, the integral over the photocurrent during the on time or a difference variable between the photocurrent and a photocurrent resulting from the ambient light, the difference variable being calculated to compensate for the influence of the ambient light. By virtue of the control unit ending the on time if the detector signal exceeds a threshold value during the on time, the on time is shortened during a measurement period in which an object is detected in the vicinity of the proximity sensor.

In other words, the duty ratio $t_{on}/T_m$ of the pulsed current intensity of the radiation-emitting component is reduced by the control unit if the detector signal has exceeded a threshold value, i.e. if an object is detected by the optoelectronic proximity sensor. In this way, the current consumption of the optoelectronic proximity sensor can be significantly reduced in comparison with an optoelectronic proximity sensor in which the current of the radiation-emitting component has a fixedly predefined duty ratio $t_{on}/T_m$. The duty ratio of the pulsed current intensity is therefore dependent on the intensity of the detector signal and is all the lower, the closer to the optoelectronic proximity sensor an object is situated and/or the better the object reflects the radiation of the radiation-emitting component.

If the detector signal does not exceed the predefined threshold value during the on time of the radiation-emitting component, the radiation-emitting component advantageously emits a pulse with a predefined maximum on time for which the optoelectronic proximity sensor has the sensitivity required for the respective arrangement. Since the on time of the pulsed current of the radiation-emitting component is reduced only if the detector signal exceeds the threshold value, the sensitivity of the optoelectronic proximity sensor is advantageously not reduced in time ranges in which no object that brings about a sufficiently high detector signal is situated in the vicinity of the optoelectronic proximity sensor.

The adaptation of the duty ratio of the pulsed current of the radiation-emitting component therefore results in a reduction of the current consumption of the radiation-emitting component in time periods in which an object is situated in the vicinity of the optoelectronic proximity sensor, without reducing the sensitivity in the time periods in which no object is situated in the vicinity of the optoelectronic proximity sensor.

Advantageously, the measurement period of the optoelectronic proximity sensor is 1 ms to 2000 ms.

If the detector signal does not exceed the threshold value, the current intensity of the radiation-emitting component has a predefined maximum on time during a measurement period. The maximum on time is preferably 1 µs to 100 ms.

In the method, the on time decreases if the detector signal exceeds the threshold value. A maximum decrease in the on time occurs in the case of a maximum detector signal, that is to say if a reflective object is situated at such a small distance from the proximity sensor that the detector signal attains a maximum value dependent on the current of the radiation-emitting component and the geometry of the arrangement. Preferably, the on time is reduced compared to the maximum on time by at least a factor of 10, preferably by at least a factor of 100, or even by at least a factor of 1000, in the case of the maximum detector signal.

The current of the radiation-emitting component may have a pulse sequence during the on time. In this configuration, therefore, the radiation-emitting component does not emit a single pulse during the on time, but rather a sequence of many successive pulses. In this case, the pulse duration of the individual pulses of the pulse sequence is preferably significantly less than the on time, in particular less than the on time by at least a factor of 10. In this configuration, here and hereinafter, the on time $t_{on}$ of the pulsed current means the duration of the pulse sequence and the duty ratio of the pulsed current means the ratio of the duration of the pulse sequence $t_{on}$ to the measurement period $T_m$. In this configuration, the on time is ended in the same way as when the pulsed current intensity emits an individual pulse during the on time. In this case, therefore, the control unit does not end an individual pulse of the current of the radiation-emitting component, but rather the pulse sequence, if the detector signal exceeds the predefined threshold value.

The optoelectronic proximity sensor is preferably designed to detect objects at comparatively small distances. By way of example, it can be provided that the detector signal exceeds the threshold value if an object is situated at a distance of less than 2 cm, less than 5 cm, or less than 10 cm, from the proximity sensor.

An optoelectronic proximity sensor operates the method described above. The above-described advantageous configurations of the method also apply to the optoelectronic proximity sensor, and vice versa.

In particular, an optoelectronic proximity sensor comprises a radiation-emitting component, a radiation-detecting component and a control unit, wherein the control unit operates the radiation-emitting component with a pulsed current, and the pulsed current has an on time and an off time during a measurement period. The control unit evaluates a detector signal of the radiation-detecting component during the on time and to end the on time if the detector signal exceeds a threshold value.

Furthermore, an electronic apparatus comprises the optoelectronic proximity sensor described. The electronic apparatus can contain, in particular, a touch-sensitive input and display device (touchscreen). The optoelectronic proximity sensor can, in particular, switch such a touch-sensitive input and display device on or off if the detector signal exceeds a predefined threshold value.

The electronic apparatus can be, for example, a cellular phone, a tablet PC or a navigation apparatus. In the case of a cellular phone, it can be provided, for example, that during a phone call it is ascertained by the optoelectronic proximity sensor whether the cellular phone is situated at the user's ear. In this case, the optoelectronic proximity sensor can detect, for example, reflection of the radiation emitted by the radiation-emitting component at the user's ear and/or cheek. In this case, the optoelectronic proximity sensor can initiate a switching process by which the touch-sensitive input and display device of the cellular phone is advantageously switched off during the duration of the phone call. In this way, during the time of the call, an undesired initiation of functions of the operating panel is avoided and an unnecessary current consumption by the input and display device is avoided. During the time of the phone call in the course of which the cellular phone is situated at the user's head, there is a small distance between the optoelectronic proximity sensor and the user's head acting as a reflector such that the detector signal exceeds the threshold value after just a short duration of a pulse or a pulse sequence. Consequently, by the method described herein, the current consumption of the optoelectronic proximity sensor of a cellular phone can be considerably reduced, in particular during the duration of a phone call.

In one exemplary calculation, a current of the radiation-emitting component of 200 mA, a duty ratio of 0.0005, a current consumption of the proximity sensor with switched-off LED pulse of 50 µA and a threshold value of the detector signal that arises for an object distance of a maximum of 5 cm were assumed. In this case, we found that with the hereindescribed dynamic adaptation of the duty ratio to the intensity of the detector signal in the case of a phone call with a duration of 200 s the current consumption can be reduced by 65% if the maximum on time of the pulses to obtain the highest sensitivity is required only for a duration of 3 s, since the cellular phone is situated at the user's ear during the remaining duration of the phone call and the on time of the pulses is thus reduced due to a strong detector signal. With the use of the operating method described here compared to operation without adaptation of the on time of the pulses to the intensity of the detector signal, the current consumption is reduced to an even greater extent if the threshold value is set for a greater maximum object distance of, for example, 10 cm or even 20 cm.

In other electronic apparatuses, too, the optoelectronic proximity sensor can advantageously be used to initiate a switching process depending on whether a user touches the apparatus or is situated directly in the vicinity of the proximity sensor. This is advantageous particularly in the case of mobile apparatuses used with rechargeable battery operation, wherein automatically switching the apparatus on and/or off depending on the position of the user can significantly lengthen the battery run time. By way of example, the optoelectronic proximity sensor can be integrated into 3D shutter spectacles used for the three-dimensional reproduction of films to switch the spectacles on when the user puts them on, and to switch them off when the user takes the spectacles off again.

Our methods and sensors are explained in greater detail below on the basis of examples in association with FIGS. 1 to 4.

Identical or identically acting constituent parts are provided with the same reference signs in each case in the figures. The illustrated constituent parts and the size relationships of the constituent parts among one another should not be regarded as true to scale.

The optoelectronic proximity sensor 1 in accordance with one example as illustrated in FIG. 1 comprises a radiation-emitting component 2, and a radiation-detecting component 3. The radiation-emitting component 2 and the radiation-detecting component 3 can be mounted, for example, alongside one another on a common printed circuit board. The radiation-emitting component 2 is preferably a radiation-emitting semiconductor component. The radiation-emitting component is, for example, a luminescence diode, in particular an infrared luminescence diode. In particular, the radiation-emitting component 2 can be an IR LED having, for example, a wavelength of approximately 850 nm.

The radiation-emitting component 2 emits electromagnetic radiation 6 in an emission direction. If an object 5 is situated in the vicinity of the optoelectronic proximity sensor 1, the electromagnetic radiation 6 emitted by the radiation-emitting component 2 is reflected at the object. The reflective object 5 can be, in particular, a body part of a user who uses an electrical apparatus into which the optoelectronic proximity sensor is integrated. If the reflective object 5 is situated in the vicinity of the optoelectronic proximity sensor 1, at least part of the electromagnetic radiation 7 reflected at the object 5 impinges on the radiation-detecting component 3. The radiation-detecting component 3 is preferably a radiation-detecting semiconductor component, for example, a photodiode, a phototransistor or some other semiconductor component that detects the reflected radiation 7.

Furthermore, the optoelectronic proximity sensor 1 comprises a control unit 4 provided in particular to electrically drive the radiation-emitting component 2 and the radiation-detecting component 3. The control unit 4 also evaluates a detector signal of the radiation-detecting component 3. The control unit 4 can comprise, for example, an integrated circuit (IC), in particular an application specific integrated circuit (ASIC). It is also possible for the radiation-detecting component 3 and/or the radiation-emitting component 2 to be a semiconductor component integrated into an ASIC functioning as a control unit. By way of example, the radiation-emitting semiconductor component 3 can be a photodiode, monolithically integrated into an ASIC.

In the optoelectronic proximity sensor 1, the radiation-emitting component 2 is operated with a pulsed current intensity. An exemplary temporal profile of the pulsed current intensity $I_e(t)$ is illustrated schematically in FIG. 2A. During a measurement period $T_m$, the radiation-emitting component 2 is switched on during an on time $t_{on}$ and then switched off for the remaining time $t_{off}$ of the measurement period $T_m$. The measurement period $T_m$ is preferably 1 ms to 2000 ms.

In the optoelectronic proximity sensor 1, the on time $t_{on}$, as will be explained in even greater detail below, is dependent on the intensity of the detector signal detected by the radiation-detecting component 3. The on time $t_{on}$ is at a maximum if the detector signal does not exceed a predefined threshold value, that is to say in particular if no object 5 is situated in the vicinity of the optoelectronic proximity sensor. The maximum on time $t_{on}$ is preferably significantly less than the off time $t_{off}$ during a measurement period $T_m$. The maximum on time $t_{on}$ if the detector signal does not exceed the threshold value can be 1 µs to 100 ms, for example.

The ratio of the on time $t_{on}$ to the measurement period $T_m$, that is to say the duty ratio $t_{on}/T_m$ of the pulsed current intensity $I_e(t)$ is advantageously less than 1/10, preferably less than 1/100 or even less than 1/1000.

FIG. 3 schematically shows the temporal profile of the current intensity $I_e(t)$ of the radiation-emitting component 2 (lower graph) and of the resultant detector signal $I_d(t)$ (upper graph) during an on time $t_{on}$ of a measurement period, wherein $I_e(t)$ and $I_d(t)$ are represented in arbitrary units. The current $I_e(t)$ of the radiation-emitting component 2 (curve 8) attains its maximum value after just a very short time such that the pulses of the radiation-emitting component 2 are virtually rectangular. During a pulse of the radiation-emitting component 2, the detector signal $I_d(t)$, for example, the photocurrent, approaches a maximum value in accordance with an exponential function, the maximum value depending on the distance and the reflectivity of the detected object 5.

The control unit 4 of the optoelectronic proximity sensor 1 measures the detector signal $I_d(t)$ during the on time, and compares the detector signal to a predefined threshold value $I_{th}$. The control unit 4 can output a logical output signal, for example, which depends on whether or not the threshold value $I_{th}$ is exceeded. In this way, in particular, a switching process can be initiated if an object 5 which initiates a detector signal $I_d(t)$ that exceeds the threshold value $I_{th}$ is situated in the vicinity of the optoelectronic proximity sensor 1.

The curve 9 in FIG. 3 represents a detector signal $I_d(t)$ which attains the threshold value $I_{th}$ only at the end of an on time of, for example, $t_{on}$=40 μs. In this case, therefore, an object 5 is situated at the maximum distance from the optoelectronic proximity sensor 1 at which the threshold value $I_d$, of the detector signal is still just reached and, for example, a switching process is initiated by the control unit 4. If the object 5 were situated at a greater distance from the optoelectronic proximity sensor 1 and/or had a lower reflectivity, the detector signal $I_d(t)$ would not attain the threshold value $I_d$, during the on time $t_{on}$ and, consequently, no switching process would be initiated.

The curve 10 in FIG. 3 shows an example of a detector signal $I_d(t)$ which arises given the presence of an object which is at a significantly smaller distance than the maximum distance provided to attain the threshold value $I_{th}$. In this case, the detector signal $I_d(t)$ exceeds the threshold value $I_{th}$ after just a short time and, without further measures, would rise until the end of the on time to a maximum value that is considerably greater than the threshold value $I_{th}$. In the optoelectronic proximity sensor described herein, however, in this case the on time of the radiation-emitting component is advantageously ended if the detector signal $I_d(t)$ has exceeded the threshold value $I_{th}$. The instant $t_{cut}$ which the on time is ended can coincide directly with the exceeding of the threshold value $I_{th}$ by the detector signal $I_d(t)$ or, for example, on account of a slight switching delay, be shortly after the exceeding of the threshold value $I_{th}$. In FIG. 3, the switch-off instant $t_{cut}$ is represented by the vertical line 11. In the case of a strong detector signal $I_d(t)$ illustrated by way of example as curve 10, therefore, that part of the curve 8 illustrated to the right of the vertical line 11 in the graph is not gone through, rather the current $I_e(t)$ of the radiation-emitting component is already switched off at the instant $t_{cut}$.

Figure 2A:
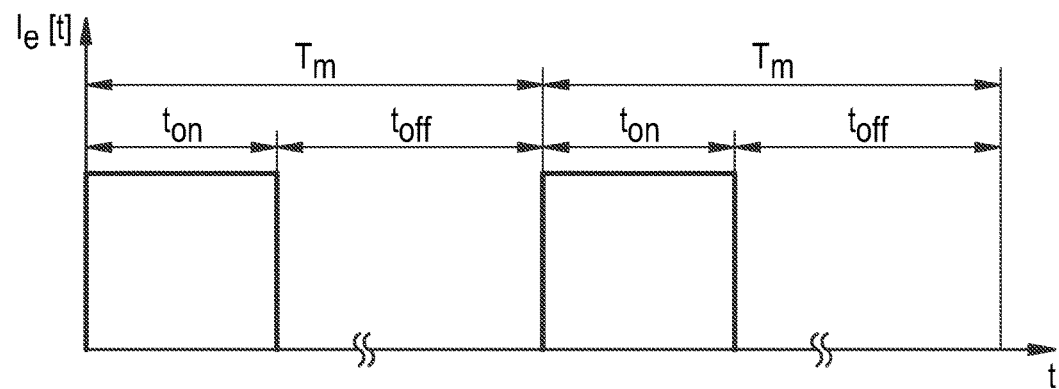
FIGS. 2A and 2B show a schematic graphical illustration of the temporal profile of the current $I_e$ of the radiation-emitting component in the case of a weak detector signal and a strong detector signal in an optoelectronic proximity sensor in accordance with one example.
Figure 2B:
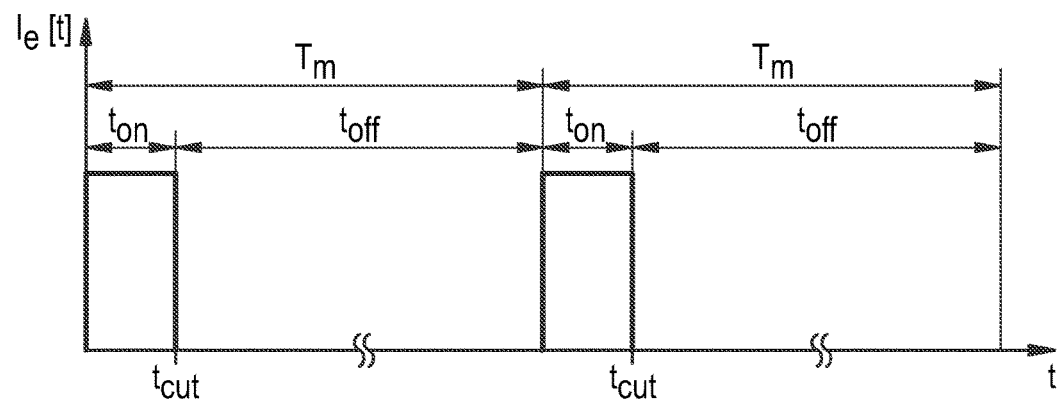

In the case of a strong detector signal, the optoelectronic proximity sensor 1, as illustrated schematically in FIG. 2B, is operated with a shortened on time $t_{on}$ of the pulsed current $I_e(t)$ of the radiation-emitting component 2 since the on time $t_{on}$ is ended by the control unit 4 at the instant $t_{cut}$. In the optoelectronic proximity sensor 1, therefore, the on time $t_{on}$ attains a predefined maximum value only if the radiation-detecting component 3 does not detect a detector signal that exceeds the threshold value $I_{th}$. By contrast, if the detector signal exceeds the threshold value $I_{th}$, the on time $t_{on}$ is ended as soon as the control unit 4 has registered an exceeding of the threshold value $I_{th}$. In this way, it is advantageously possible to significantly reduce the current consumption of the optoelectronic proximity sensor 1 while an object 5 is detected by the optoelectronic proximity sensor 1.

The reduction of the on time $t_{on}$ is all the greater, the greater the detector signal. Advantageously, the on time is reduced by at least a factor of 10, preferably at least a factor of 100, or even by at least a factor of 1000, for at least one detector signal, in particular in the case of the maximum detector signal dependent on the geometry of the arrangement and the current.

In one configuration of the optoelectronic proximity sensor 1, the radiation-emitting component 2 does not emit a single pulse, but rather a pulse sequence, during the on time $t_{on}$. The temporal profile of the current intensity $I_e(t)$ in this configuration is schematically illustrated for a detector signal below the threshold value $I_{th}$ in FIG. 4A and for a detector signal above the threshold value $I_{th}$ in FIG. 4B.

Figure 4A:
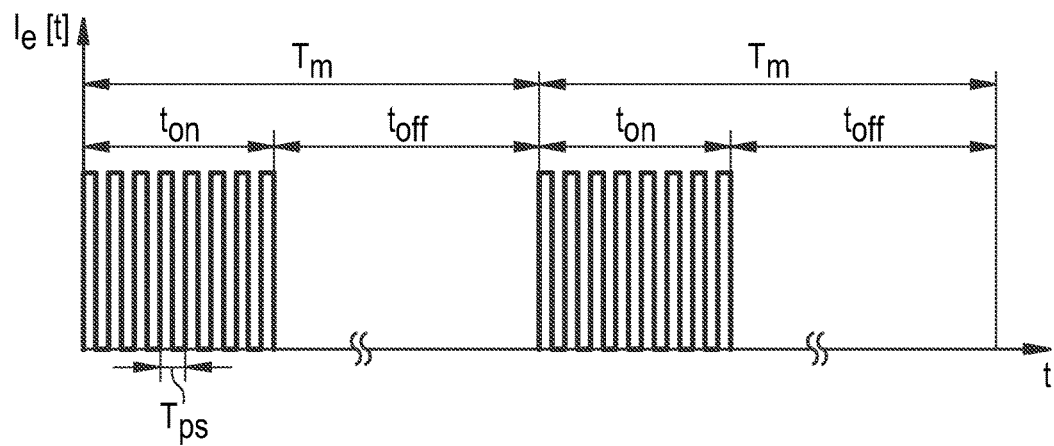
FIGS. 4A and 4B show a schematic graphical illustration of the temporal profile of the current $I_e$ of the radiation-emitting component in the case of a strong detector signal and a weak detector signal in an optoelectronic proximity sensor in accordance with one example.

As illustrated in FIG. 4A, the current intensity $I_e(t)$ has a sequence of rectangular pulses during the on time $t_{on}$. During a measurement period $T_m$, the radiation-emitting component is switched off for an off time $t_{off}$ after the pulse sequence. In this configuration, the on time $t_{on}$ is understood to mean the duration of the pulse sequence. The pulse sequence has a period duration $T_{ps}$ that is preferably significantly less than the measurement period $T_m$. By way of example, $T_{ps}/T_m<1/10$, preferably $T_{ps}/T_m<1/100$ or even $T_{ps}/T_m<1/1000$. The short-periodic modulation of the current intensity $I_e(t)$ of the radiation-emitting component 2 during the on time $t_{on}$ can advantageously also be ascertained in the detector signal and serves in particular for reducing the signal-to-noise ratio. During the evaluation of the detector signal it is possible to filter out e.g. non-modulated portions of the detector signal which arise e.g. as a result of the influence of ambient light.

Figure 4B:
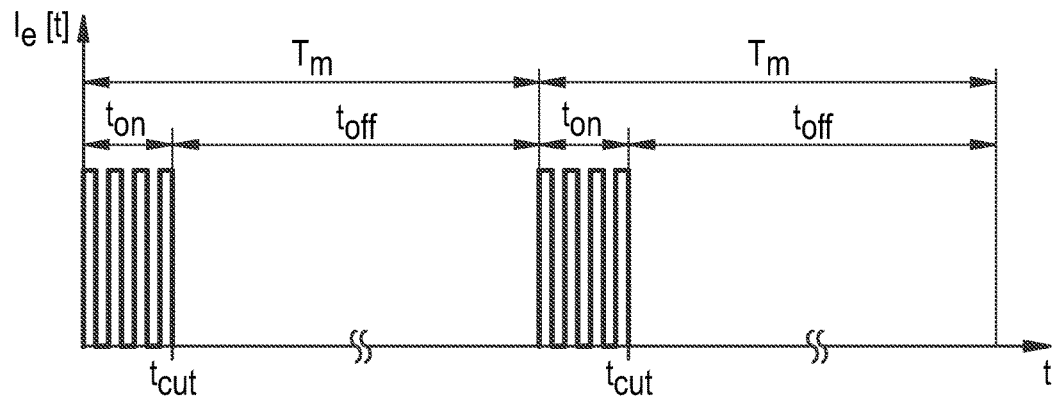

As illustrated in FIG. 4B, as in the case of the previous example, the on time $t_{on}$ is reduced if the detector signal exceeds the threshold value $I_{th}$ during the on time $t_{on}$. In this configuration, this means that the pulse sequence of the current LW of the radiation-emitting component is ended at an instant $t_{cut}$ at which the detector signal exceeded the threshold value $I_{th}$. The duration of the pulse sequence $t_{on}$ is therefore shorter in the case of a strong detector signal than in the case of a detector signal that does not exceed the threshold value $I_{th}$. In this way, the current consumption of the optoelectronic proximity sensor is advantageously reduced as in the case of operation with individual pulses.

Our methods and sensors are not restricted by the description on the basis of the examples. Rather, this disclosure encompasses any novel feature and also any combination of features, which in particular includes any combination of features in the appended claims, even if the feature or combination itself is not explicitly specified in the claims or examples.

The invention claimed is:

1. A method of operating an optoelectronic proximity sensor comprising a radiation-emitting component, a radiation-detecting component and a control unit, the method comprising:
   operating the radiation-emitting component with a pulsed current during a measurement period, wherein
   the pulsed current of the radiation-emitting component has an on time of a predetermined duration and an off time during the measurement period, and
   causing the control unit to evaluate a proximity detection signal of the radiation-detecting component indicating proximity during the on time and ending the on time even if before expiration of the predetermined duration, if the proximity detection signal exceeds a threshold value, wherein
   the ratio of the on time to the measurement period is less than 1/10.

2. The method according to claim 1, wherein the pulsed current of the radiation-emitting component has a predefined maximum on time during a measurement period if the proximity detection signal does not exceed the threshold value.

3. The method according to claim 2, wherein the maximum on time ($t_{on}$) is 1 μs to 100 ms.

4. The method according to claim 1, wherein the on time is reduced by at least a factor of 10 in the case of a maximum proximity detection signal.

5. The method according to claim 4, wherein the on time is reduced by at least a factor of 100 in the case of a maximum proximity detection signal.

6. The method according to claim 1, wherein the measurement period is 1 ms to 2000 ms.

7. The method according to claim 1, wherein the pulsed current of the radiation-emitting component has a pulse sequence during the on time of a measurement period, and a period of the pulse sequence is less than the on time by at least a factor of 10.

8. An optoelectronic proximity sensor comprising a radiation-emitting component, a radiation-detecting component and a control unit wherein the control unit
  operates the radiation-emitting component with a pulsed current during a measurement period, the pulsed current has an on time of a predetermined duration and an off time during the measurement period, and a ratio of the on time to the measurement period is less than 1/10, and
  evaluates a proximity detection signal of the radiation-detecting component indicating proximity during the on time and to end the on time even if before expiration of the predetermined duration, if the proximity detection signal exceeds a threshold value.

9. The optoelectronic proximity sensor according to claim 8, wherein the pulsed current of the radiation-emitting component has a predefined maximum on time during a measurement period if the proximity detection signal does not exceed the threshold value.

10. The optoelectronic proximity sensor according to claim 9, wherein the maximum on time is 1 µs to 100 ms.

11. The optoelectronic proximity sensor according to claim 8, wherein the on time is reduced by at least a factor of 10 in the case of a maximum proximity detection signal.

12. The optoelectronic proximity sensor according to claim 11, wherein the on time is reduced by at least a factor of 100 in the case of a maximum proximity detection signal.

13. An electronic apparatus comprising an optoelectronic proximity sensor according to claim 8.

14. The electronic apparatus according to claim 13, further comprising a touch-sensitive input and display device.

15. The electronic apparatus according to claim 13, which is a cellular phone, a tablet PC or a navigation apparatus.

* * * * *